United States Patent [19]

Lee

[11] Patent Number: 5,161,134
[45] Date of Patent: Nov. 3, 1992

[54] METHOD FOR INCREASING LINEAR BIT DENSITY IN MAGNETO-OPTICAL STORAGE MEDIA

[75] Inventor: Neville K. S. Lee, Sherborn, Mass.

[73] Assignee: Digital Equipment Corporation, Maynard, Mass.

[21] Appl. No.: 373,991

[22] Filed: Jun. 29, 1989

[51] Int. Cl.⁵ .................... G11B 11/00; G11B 7/00; G01J 1/32

[52] U.S. Cl. .................... 369/13; 369/116; 369/117; 369/118; 250/201.5

[58] Field of Search ............. 369/13, 116, 117, 118, 369/277, 275.1, 275.2, 275.3; 359/894; 250/201.5, 216, 237 R

[56] References Cited

U.S. PATENT DOCUMENTS

| | | | |
|---|---|---|---|
| 1,750,863 | 3/1930 | Royal | 369/116 |
| 1,970,958 | 8/1934 | Ernst | 369/118 |
| 2,323,606 | 7/1943 | Kellogg | 369/116 |
| 2,923,781 | 2/1960 | Gordon | 369/117 |
| 3,764,759 | 11/1970 | Herriger et al. | 179/100.4 |
| 3,983,317 | 12/1974 | Glorioso | 178/6.6 |
| 4,115,809 | 11/1976 | Ueno | 358/128 |
| 4,176,377 | 11/1979 | Howe | 358/128 |
| 4,209,793 | 12/1978 | Ueno | 346/108 |
| 4,315,283 | 4/1979 | Kinjo et al. | 358/128 |
| 4,322,125 | 3/1982 | Warren | 350/1 |
| 4,322,737 | 3/1982 | Sliwa | 357/82 |
| 4,403,318 | 9/1983 | Nagashima et al. | 369/100 |
| 4,412,264 | 10/1983 | Imamura | 369/13 |
| 4,423,502 | 12/1983 | Dil | 369/275 |
| 4,513,407 | 4/1985 | Bricot | 369/44 |
| 4,516,234 | 5/1985 | Nakagawa | 369/109 |
| 4,525,828 | 3/1986 | Higashiyama et al. | 369/111 |
| 4,616,237 | 10/1986 | Pettigrew et al. | 346/135 |
| 4,633,450 | 12/1986 | Gueugnon | 369/13 |
| 4,633,457 | 1/1987 | Yamamoto | 369/116 |
| 4,635,076 | 1/1987 | Willson | 365/122 |
| 4,658,279 | 4/1987 | Guckel | 357/4 |
| 4,703,469 | 10/1987 | Pettigrew et al. | 369/101 |
| 4,724,444 | 2/1988 | Pettigrew et al. | 346/1 |
| 4,758,307 | 7/1988 | Pettigrew et al. | 156/643 |
| 4,769,800 | 9/1988 | Moser | 369/13 |
| 4,786,585 | 11/1988 | Humberstone et al. | 430/495 |
| 4,816,841 | 3/1989 | Kobayashi et al. | 346/76 |

FOREIGN PATENT DOCUMENTS

| | | |
|---|---|---|
| 0341829 | 1/1990 | European Pat. Off. . |
| 0437630 | 11/1935 | Fed. Rep. of Germany ...... 369/118 |
| 2652795 | 5/1981 | Fed. Rep. of Germany . |
| 89-904573/13 | 3/1989 | Fed. Rep. of Germany . |
| 55-122244 | 9/1980 | Japan . |
| 0186248 | 11/1982 | Japan .................... 369/13 |
| 0177535 | 10/1983 | Japan .................... 369/118 |
| 58-177538 | 1/1984 | Japan . |
| 60-261052 | 12/1985 | Japan . |
| 61-039251 | 2/1986 | Japan . |
| 0105745 | 5/1986 | Japan .................... 369/118 |

OTHER PUBLICATIONS

Lee et al., U.S. patent application Ser. No. 192,950 filed May 12, 1988.
Lee, U.S. patent application Ser. No. 192,953 filed May 12, 1988.
Gardner et al "Plasmon Media Technology", Technical Digest of IEEE/OSA Topical Meeting on Optical Data Storage, Washington, 1985, paper WDD4.
Gardner et al "Volume Production of Plasmon Optical Discs", Technical Digest of IEEE/OSA Topical Meeting on Optical Data Storage, Washington, 1985, paper WDD5.
Suh et al "Signal-to-Noise Measurements on Textured Optical Storage Media", Proc. SPIE Opt. Data Storage, vol. 382, Incline Village, Nev., 1983, pp. 196-199.

*Primary Examiner*—Stuart S. Levy
*Assistant Examiner*—Tan Nguyen
*Attorney, Agent, or Firm*—Fish & Richardson

[57] ABSTRACT

An apparatus for storing and reading a magneto-optical disk has a slit shaped aperture located in an air-bearing slider which flies above the disk. Domains of the disk are selected for storing or reading by a light beam. The domains are reduced in size without losing inter-domain resolution by illuminating the disk with the portion of a focused laser beam incident on the disk through the slit, the slit width being less than the full beam width. The slider preferably terminates a wedge-shaped cavity suspended above the medium a distance substantially less than the wavelength of the illuminating light; the thickness of the edges of the slit being substantially less than the wavelength of the illuminating light.

16 Claims, 6 Drawing Sheets

METHOD FOR INCREASING LINEAR BIT DENSITY IN MAGNETO-OPTICAL STORAGE MEDIA

CROSS-REFERENCE TO RELATED APPLICATION

The present application is related to application Ser. No. 07373,939, filed on the same day as this application by Neville K. S. Lee, et al, entitled "Method for Increasing Track Density of Magneto-Optical Storage Media", assigned to the same assignee as the present application, and incorporated by reference herein in its entirety.

BACKGROUND OF THE INVENTION

This invention relates to techniques for increasing the density of recorded digital information on magneto-optical storage media.

The exploding demand for computer memory has propelled current research in memory systems in the direction of magneto-optical (M-O) technology. The M-O medium, typically in the form of a disk, comprises a thin magnetic layer covered with a relatively thick transparent coating. Digital information is stored in the M-O medium by locally magnetized regions or "domains" in the magnetic layer of one polarity or another corresponding to "1's" and "0's". While the information is thus retained magnetically in a manner analogous to conventional magnetic media, the writing and reading processes usually involve laser beams. M-O writing is thermally assisted. A pulsed laser beam is focused through the transparent overcoat onto the surface of the magnetic layer. The coercivity of the magnetic medium area exposed to the beam is temporarily lowered by the heat induced by the laser pulse, enabling the local orientation of the magnetic domains to be redirected by means of a magnetic field. Reading is accomplished through Kerr or Faraday rotation of the angle of polarization of a low power (non-heating) incident laser beam (ordinarily supplied by the same laser used in writing). Depending on the local orientation of the magnetic media, the polarization angle of the reflected beam rotates slightly clockwise or counterclockwise. This shift in the polarization angle determines whether the cell contains a "1" or a "0".

A known magneto-optical drive system is shown in FIG. 1. The diskette 10 is written and read by a focused laser beam 12. The laser beam 13 is focused by lens 14. As shown in FIG. 2, disk 10 contains, in a radial recording region 16 of one face 15, a spiral track of spaced magnetic domains. Alternatively, the recording region 16 can carry plural concentric circular tracks. As shown in FIG. 3, the dimension of a domain in the linear direction is preferably bigger than the size of the intense portion of the focused laser beam.

SUMMARY OF THE INVENTION

The invention comprises an optical head defining a narrow slit shaped aperture juxtaposed within a wavelength of the surface of an optical or magneto-optical storage medium bearing parallel tracks. The slit occludes lateral portions of an incident laser beam in the track direction. The aperture is ideally long enough to cover many tracks. In the preferred embodiment, a rectangular slit is formed from a wedge-shaped cavity in an air-bearing slider, where the slider is suspended directly adjacent to the medium, and the longer dimension of the rectangular slit is oriented in the cross-track direction. A region of one of the storage tracks can be selected for storing or reading through illumination of this region by the portion of the focused light beam incident on the medium through the slit.

Another general feature of the invention is an optical data storage apparatus as discussed above, where the optical data storage medium includes one or more recording tracks on one face of the medium, and one or more non-recording tracks on the same medium face. The recording and non-recording tracks do not intersect, and the non-recording tracks are adjacent to the recording tracks. Recording is accomplished by modulation of a physical property along the recording track. The non-recording tracks are less responsive to the recording signal than the recording tracks.

Other advantages and features will become apparent from the following description of the preferred embodiments and from the claims.

BRIEF DESCRIPTION OF THE DRAWINGS

We first briefly describe the drawings

DESCRIPTION OF THE PREFERRED EMBODIMENTS

The embodiments of the invention described below are envisioned primarily for use in conjunction with magneto-optical disk technology. However, the invention is generally applicable to other optical disk technologies, such as phase transformation, write once, and read only, including audio CD.

Figure 1:
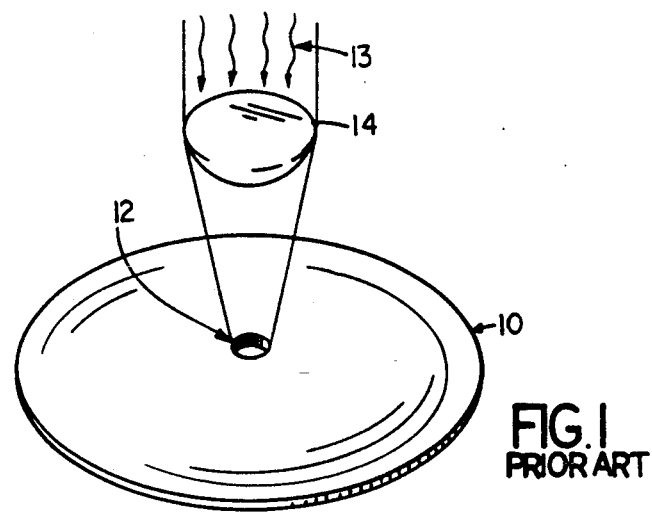
FIG. 1 is a diagram of a laser beam illuminating a prior art magneto-optical diskette as viewed in perspective.
Figure 2:
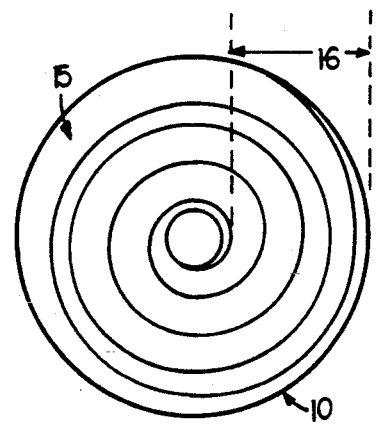
FIG. 2 is a diagrammatic top view of a prior art magnetooptical diskette showing the basic geometry of a spiral recording track structure.
Figure 3:
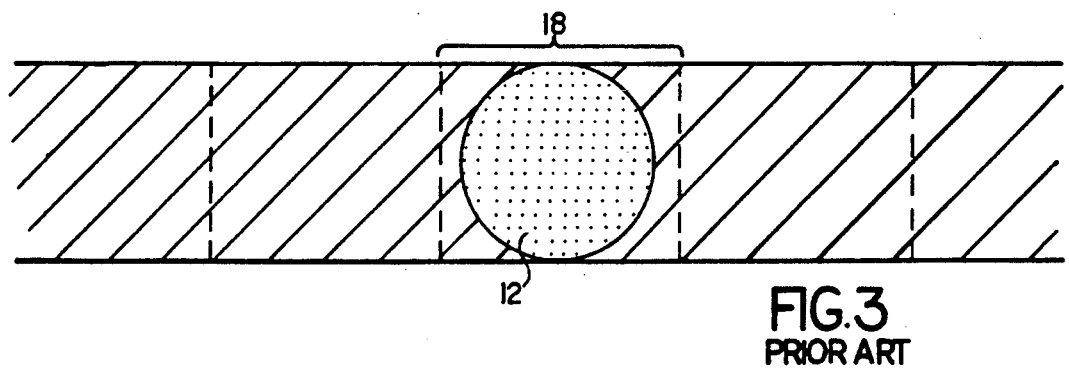
FIG. 3 is a schematic representation of the geometry of prior art magneto-optical domains and the focused laser beam.

As seen in FIG. 1, known magneto-optical diskettes are written and read by a laser beam 13. The distribution of intensity of the focused laser beam 12 directly influences the density of information on the diskette. As seen in FIG. 2, information is written in spiral tracks of domains on one face 15 of the diskette. As seen in FIG. 3, the length of these domains 18 along the track direction should be large enough to resolve adjacent domains. The invention increases the linear density of magneto-optical recording without sacrificing the fine tracking information obtained from a wide focused beam distribution.

Figure 4A:
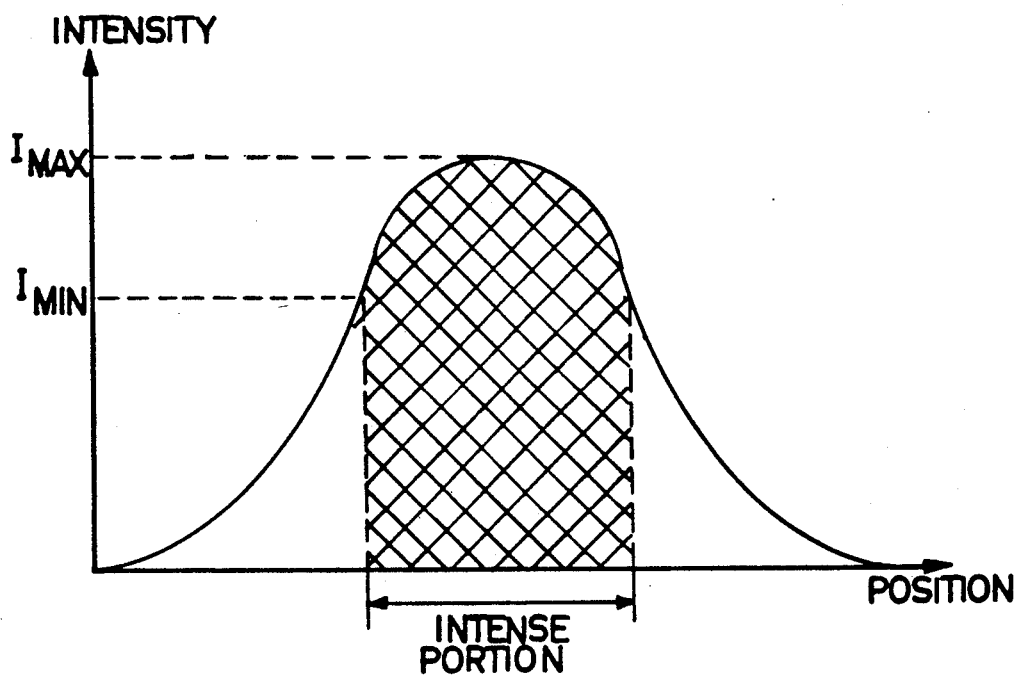
FIGS. 4A and 4B are plots of the spacial intensity of the laser beam versus displacement.

FIG. 4A clarifies the distribution of intensity of the focused laser beam. As can be seen in the plot of FIG. 4A, the intensity of the focused laser beam has a Gaussian distribution with respect to position. The majority of the power of this beam lies in the central region around the maximum intensity $I_{MAX}$. To achieve a tolerable signal to noise ratio, the intense regions of the focused beam (i.e. those regions with intensity greater than $I_{MIN}$, which is a given fraction of the maximum intensity) should not be allowed to produce interference. Therefore, these regions should not be allowed to illuminate adjacent domains.

Figure 4B:
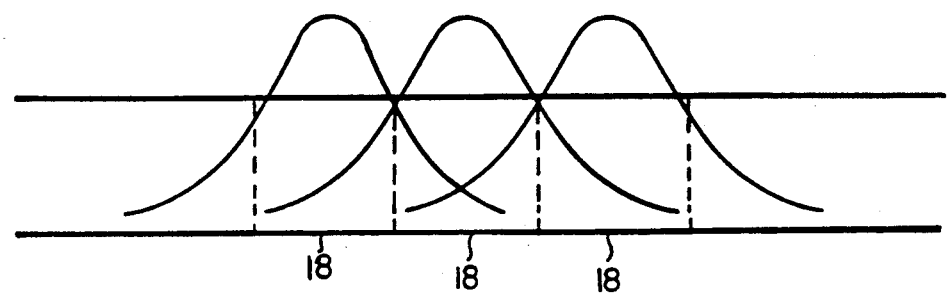

Referring to FIG. 4B, the nature of the interference between adjacent domains is illustrated. The Gaussian nature of the focused laser beam implies that portions of the focused laser beam will illuminate adjacent domains 18, reducing the resolution between domains and therefore the amplitude of the detected signal. However, if the ratio of the signal response from the desired domain to the response from other domains is large, the error rate of the system is tolerable, and may be corrected by a suitable error correction code.

Figure 5A:
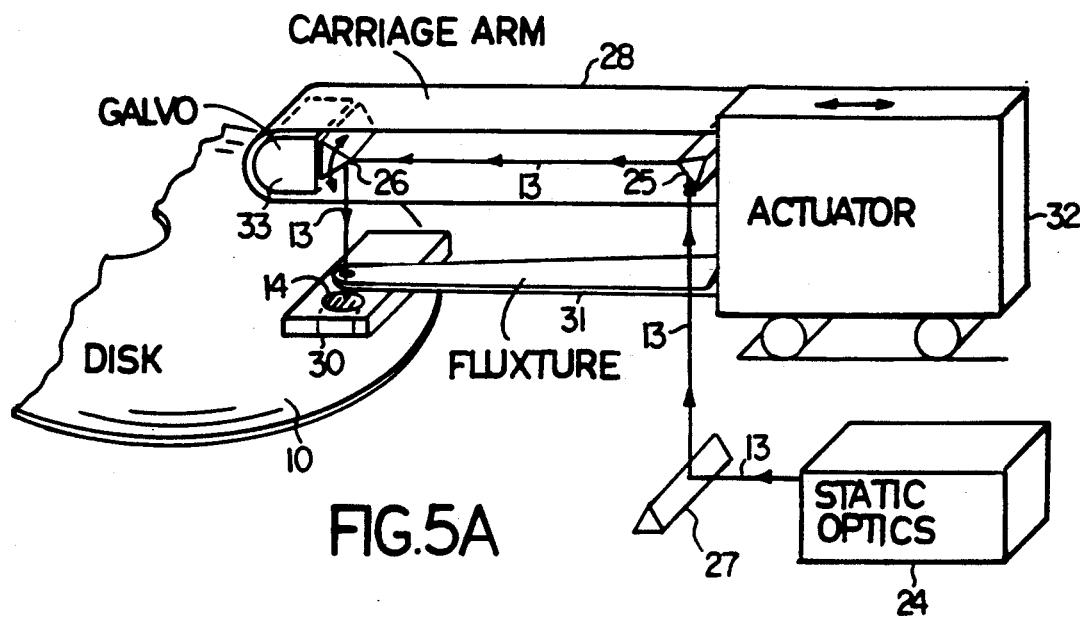
FIGS. 5A and 5B are diagrams of the optical actuator system and air-beaming slider as viewed in perspective.

FIG. 5A illustrates an optical actuator system. The laser beam 13 is generated by static optics 24 and relayed to the lens 14 via a network of movable and fixed mirrors 25, 26, and 27. A carriage arm 28 supports one of the mirrors 26 at the end of the carriage arm, which directs the laser beam towards the diskette media 10 and the focusing lens 14. A second mirror 25 is suspended at a fixed position (relative to the static optics 24 and the disk 10) inside of arm 28. The second mirror reflects the beam along arm 28. A third mirror 27 guides the laser beam 13 from the static optics 24 (which are mounted directly below actuator 32) onto the fixed second mirror 25.

The focusing lens !4 is supported by an air-bearing slider 30 which hovers just above the spinning disk media 10. The slider is held in position by a hinged fluxture (i.e. flexure hinge) 31. The fluxture 31 and the carriage arm 28 are attached to an actuator 32, which aligns arm 28, mirror 26, fluxture 31, and slider 30 in the cross-track direction (i.e., the direction perpendicular to the direction of the track, e.g., radial with respect to concentric tracks). To adjust the fine tracking of the beam in the embodiment of the invention shown in FIG. 5A, mirror 26 is tilted to direct the laser beam. In other embodiments of the invention, another one of the mirrors 25 or 27 may be tilted to adjust the fine tracking. The first embodiment, as illustrated in FIG. 5A, allows for better tilt-control, owing to the reduced distance between the tilting mirror 26 and the lens 14. A small magnetic galvo coil 33 is included to control the tilt of mirror 26.

Figure 5B:
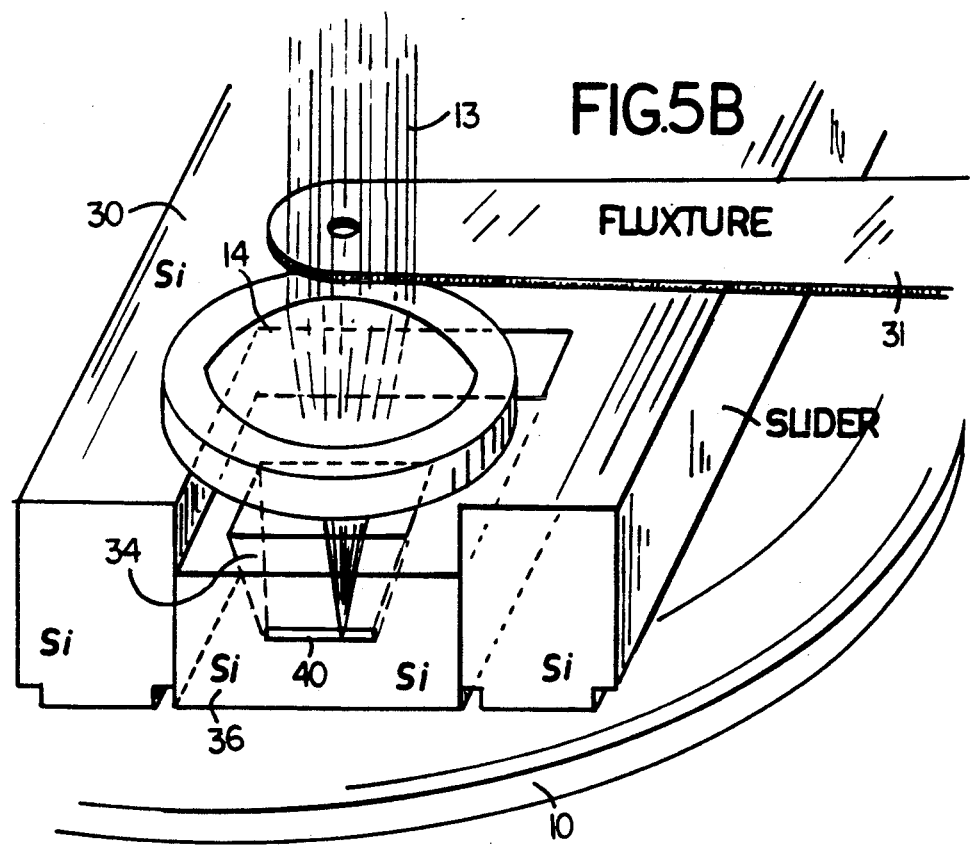

FIG. 5B illustrates the detailed structure of air bearing slider 30, lens 14, and laser beam 13. Lens 14 is supported over a rectangular pyramidal cavity 34 etched into a crystalline wafer 36, which is then cemented to the slider 30. The focused laser beam traverses the cavity 34 and exposes the media 10 through a narrow slit 40.

The presently preferred manufacture of pyramidal cavity 34 uses a silicon wafer 36 subjected to anisotropic preferential etching. A monocrystalline wafer 36 of pure silicon 15-20 mils thick is produced with the proper crystal orientation. Next, wafer 36 is etched with a conventional etchant along preferred crystal planes using suitable rectangular masks. The desired result, as illustrated in FIG. 5B, is a rectangular pyramidal cavity having four sides, the cavity terminating in a rectangular slit. The longer legs of the slit are oriented in the crosstrack direction. The silicon wafer 36 containing the cavity and slit is cemented into a silicon slider 30 by conventional means. In alternative embodiments, the slider 30 may be manufactured as an integrated structure, eliminating the cementing step.

Other embodiments of optical armature structures may be found in patent application Ser. No. 192,950, filed on May 12, 1988 now U.S. Pat. No. 5,105,408 by Neville K. S. Lee et al., entitled "Optical Head System", and patent application Ser. No. 192,953, filed on May 12, 1988 now abandoned by Neville K. S. Lee, entitled "A Low Mass Optical Head System", both having to the same assignee as the present application and incorporated herein in their entirety.

Figure 5C:
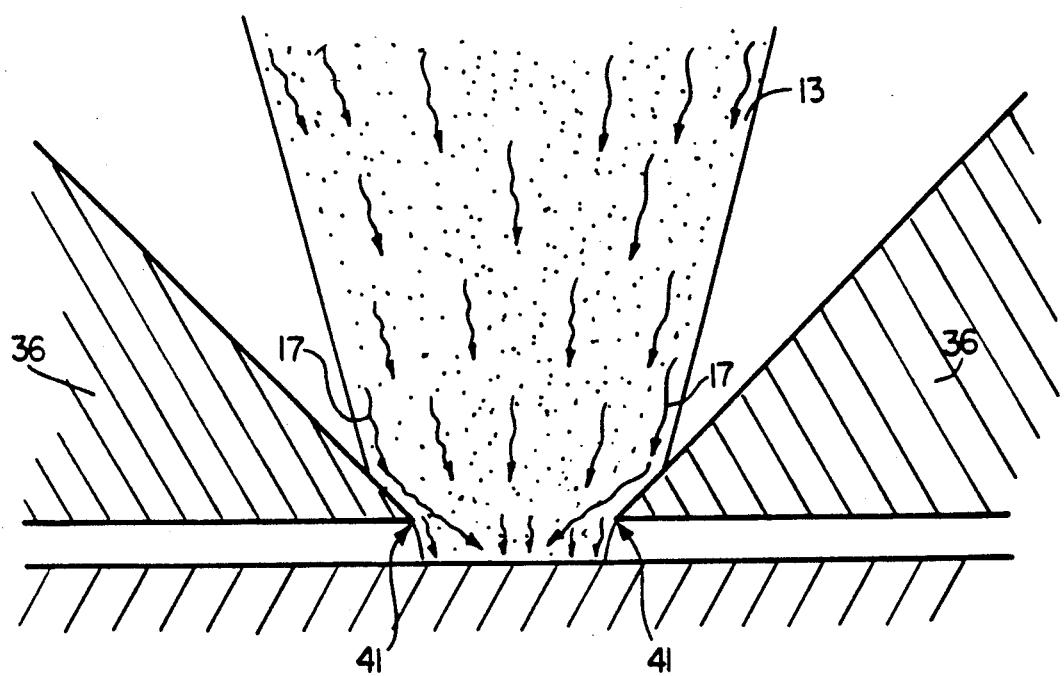
FIG. 5C is a cross-sectional view of the slit of FIG. 5B and the focused beam.
Figure 6:
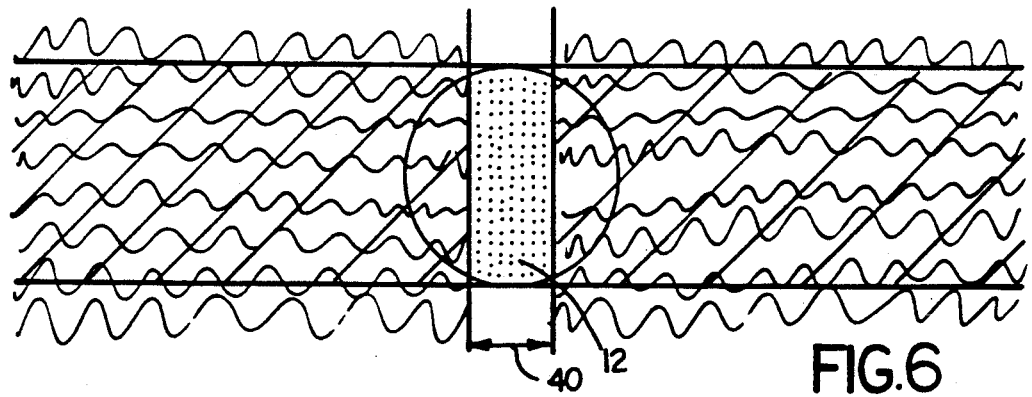
FIG. 6 a diagram of the focused laser beam illuminating the slit of FIG. 5C.

FIGS. 5C and 6 are cross-sectional and top views of the focused laser beam illuminating the domain track through the slit 40. It can be seen in FIG. 6 that slit 40 masks the beam in the linear direction (i.e. the direction of the underlying track), such that the effective distribution of intensity of the focused beam is narrower. This will be the case wherever the slit is suspended a distance from the media which is substantially less than the wavelength of the incident light. Referring to FIG. 5C, this means that the distance x is less than the wavelength of the laser light 13. Also, the thickness of the walls of the slit must be much less than the wavelength of the incident light. Referring to FIG. 5C, this means that the edges 41 of slit 40 are razor sharp, as shown. As seen in FIG. 5C, the combination of low flying height (i.e., distance less than the wavelength of the laser light) and a sharp-edged, wedge shaped aperture allows the distribution of the focused laser light 13 to be further narrowed by the slit, in that beams 17 which intersect the wedge-shaped aperture at a high angle are refracted into the aperture and thereby increase the intensity of the light incident on the medium.

In one presently preferred embodiment of the invention, the incident light has a wavelength of approximately 830 nm (i.e. 0.83 $\mu$m), and the numerical aperture of the lens 42 is approximately 0.55, such that the "spot size" (i.e. the distance between the points in the focused laser beam which have intensity greater than a given fraction of the maximum intensity) is about 1 $\mu$m. In this embodiment, the distance x, i.e. the flying height of the slider, is between 0.1 $\mu$m and 0.3 $\mu$m, and the slit width (i.e., the slit dimension along the direction of the tracks) is approximately 0.6 $\mu$m.

Figure 7:
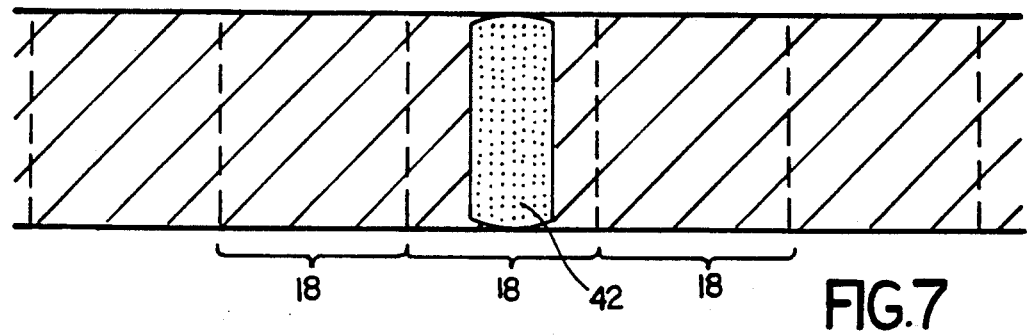
FIG. 7 is a diagram of the effective focused beam geometry achieved through the use of the slit of FIG. 6.

FIG. 7 shows the effective focused laser beam geometry 42 under the above conditions. The effective focused laser beam distribution 42 is narrow in the linear track direction, which allows the magnetic domains 18 to be more closely spaced than in known systems without a corresponding reduction in signal to noise resolution of domains. However, the effective distribution 42 maintains its original character in the cross-track direction, thus allowing for reflections from the track edges which can be used to sense tracking errors. Because it provides for a narrow focused beam distribution in the linear track direction, but a wide distribution in the cross-track direction, the invention increases the density of data storage along the tracks without compromising the tracking performance of the system.

Figure 8:
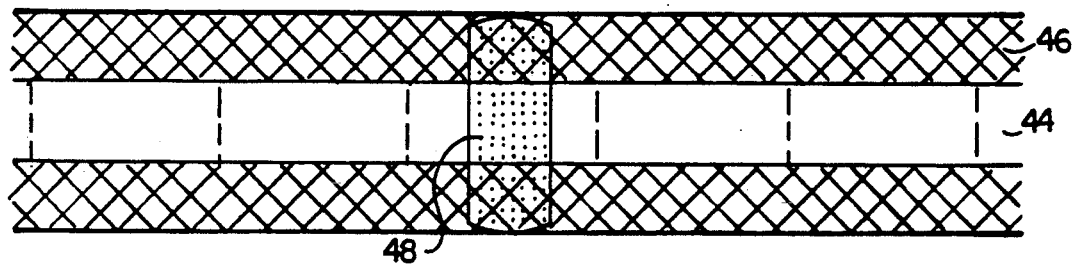
FIG. 8 illustrates the use of alternating recording and non-recording tracks.
Figure 9:
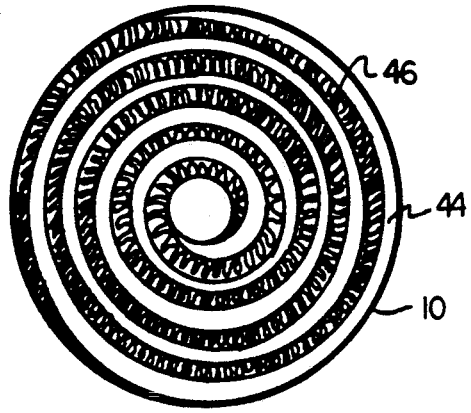
FIG. 9 is a diagrammatic top view of a magneto-optical diskette showing the dual-track structure of FIG. 8.

FIG. 8 shows a presently preferred embodiment of the invention, where the recording tracks 44 alternate with non-recording tracks 46. FIG. 9 shows a top view of a diskette medium containing spiral recording and non-recording tracks 44 and 46 respectively. The use of non-recording tracks 46 allows for increased storage density in the cross-track direction, as discussed in the above-referenced co-filed patent application entitled "Method For Increasing Track Density of Magneto Optical Storage Media". In preferred embodiments, the fine tracking of the laser beam and the alignment of the slit 40 is such that the center polygon 48 contains only the most intense regions of the focused beam 12. For example, for the slit dimensions given above, the recording track pitch could be 1.0 $\mu$m, and the recording track width could be 0.6 $\mu$m.

Figure 10:
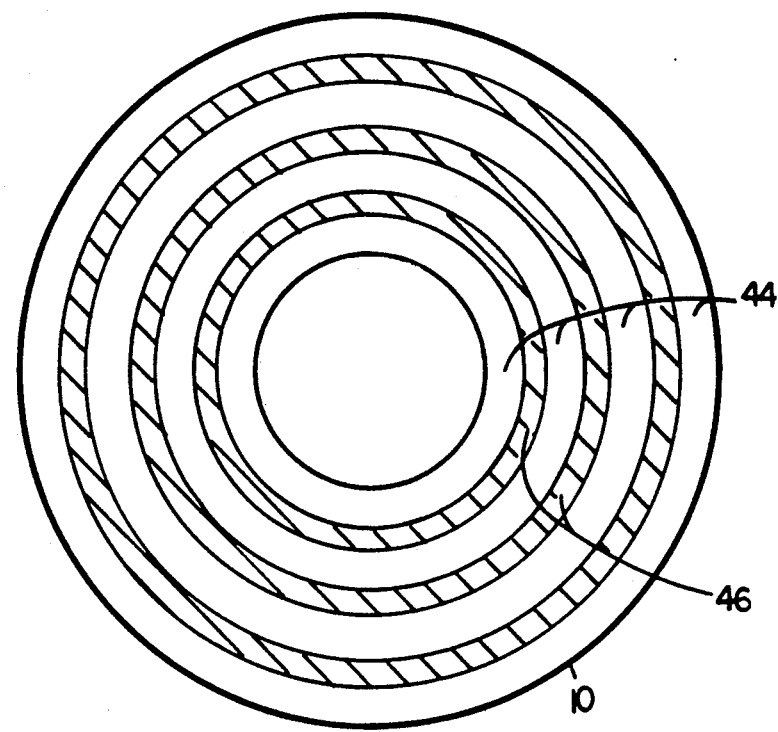
FIG. 10 is a diagrammatic top view of an alternative embodiment of a dual-track magneto-optical diskette.
Figure 11:
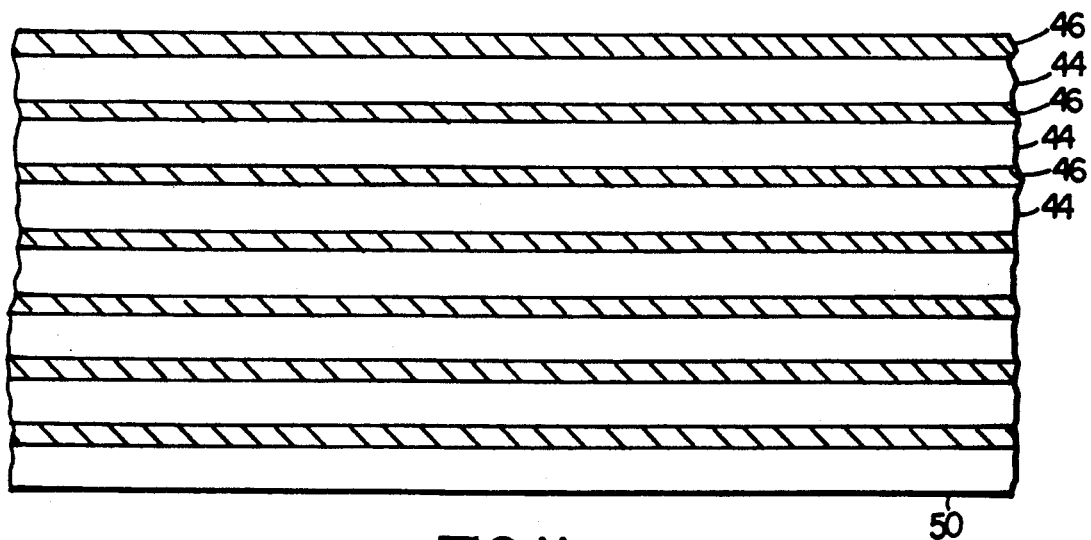
FIG. 11 is a diagrammatic top view of a dual-track magneto-optical storage card.

Other embodiments of the invention are within the scope of the following claims. For example, FIG. 10 shows a diskette 10 containing circular concentric recording and non-recording tracks 44, 46 according to an alternative embodiment of the invention. FIG. 11 shows recording and non-recording tracks 44, 46 arranged in linear alignment with the face of a magneto-optical storage card medium 50.

The configuration of the slit and air-bearing slider may be different from those configurations disclosed above without departing from the scope of the claims. In addition, the manufacture of the slit and the directing and focusing the laser beam can be accomplished in ways different from the embodiment disclosed herein without exceeding the scope of the following claims.

What is claimed is:

1. An optical storage apparatus comprising:
   a mechanism for generating and focusing a light beam having a predetermined wavelength onto an optical storage medium having storage tracks each track having a predetermined pitch, and
   a slider including an elongated slit which has a length and a width, said slider being suspended above said medium so that the length of said slit is oriented along the cross-track direction and said slit is located a distance above said medium substantially less than the wavelength of said light beam;
   wherein the thickness of the edges of said slit is substantially less than the wavelength of said light beam, the length of said slit is greater than twice the wavelength of said light beam, and the width of said slit is not substantially greater than the wavelength of said light beam,
   whereby a small region of one said storage track is selected for reading through illumination of said region by the portion of said focused light beam incident on said medium through said slit.

2. The apparatus of claim 1 wherein said slit is substantially rectangular in shape.

3. The apparatus of claim 1 wherein said slit terminates a cavity of wedge-shaped cross-section.

4. The apparatus of claim 3 wherein said cavity is formed from preferential etching of a crystalline structure.

5. The apparatus of claim 1 wherein
   said medium comprises alternating recording and non-recording tracks,
   said recording tracks are responsive to a recording signal for recording information by modulation of a physical property along said recording tracks, and
   said non-recording tracks are less responsive to said recording signal than said recording tracks.

6. The apparatus of claim 1 wherein
   said medium is a disk having two faces and
   said tracks comprise spiral tracks through one said disk face.

7. The apparatus of claim 1 wherein
   said medium is a disk having two faces and
   said tracks comprise concentric circular tracks through one said disk face.

8. An optical storage apparatus, comprising:
   means for generating and focusing a light beam having a predetermined wavelength onto an optical storage medium having storage tracks each track having a predetermined pitch, and
   a slider suspended above said medium, said slider defining a cavity of wedge-shaped cross-section terminating in an elongated slit oriented in the cross-track direction, the thickness of the edges of said slit being substantially less than the wavelength of said light beam, the length of said slit being greater than twice the pitch of said storage tracks, said slit being suspended a distance above said medium substantially less than the wavelength of said light beam;
   whereby a small region of one said storage track is selected for reading through illumination of said region by the portion of said focused light beam incident on said medium through said slit.

9. The apparatus of claim 8 wherein
   said medium is a disk having two faces and
   said tracks comprise spiral tracks through one said disk face.

10. The apparatus of claim 8 wherein the width of said slit is not substantially greater than the wavelength of said light beam.

11. The apparatus of claim 8 wherein said wedge-shaped cavity and said slit are formed by preferential etching of a crystalline structure.

12. The apparatus of claim 8 wherein
    said medium comprises alternating recording and non-recording tracks,
    said recording tracks are responsive to a recording signal for recording information by modulation of a physical property along said recording tracks, and
    said non-recording tracks are less responsive to said recording signal than said recording tracks.

13. The apparatus of claim 8 wherein
    said medium is a disk having two faces and
    said tracks comprise concentric circular tracks through one said disk face.

14. An optical head for reading an optical storage medium having recording tracks each track having a predetermined pitch comprising:
    a slider defining an elongated slit-shaped aperture which has a length and a width;
    a support juxtaposing said aperture within a wavelength of the surface of said medium with the long dimension of said aperture extending in the cross-track direction, and
    a lens focusing a laser beam having a predetermined wavelength through said aperture onto a focal point on said medium;
    wherein the length of said aperture is greater than twice the wavelength of said light beam and the thickness of the edges of said aperture is substantially less than the wavelength of said light beam, and the width of said slit is not substantially greater than the wavelength of said light beam, whereby low intensity portions of the focused beam extending from the focal point in the track direction are occluded by said aperture.

15. An optical head for reading an optical storage medium having recording tracks each track having a predetermined pitch comprising:
 a lens focusing a laser beam which has a predetermined wavelength through an elongated slit-shaped aperture;
 a slider defining a cavity of wedge-shaped cross-section terminating in said elongated slit-shaped aperture;
 a support juxtaposing said aperture within a wavelength of the surface of said medium with the long dimension of said aperture extending in the cross-track direction; and
 wherein the long dimension of said aperture is greater than twice the pitch of said tracks and the thickness of the edges of said aperture is substantially less than the wavelength of the light beam
 whereby low intensity portions of the focused beam extending from the focal point in the track direction are occluded by said aperture.

16. An optical storage apparatus comprising:
 means for generating and focusing a light beam having a predetermined wavelength onto an optical storage medium having storage tracks which have a predetermined pitch,
 a slider having an elongated slit, the thickness of the edges of said slit being substantially less than the wavelength of said light beam, the length of said slit being greater than twice the pitch of said storage tracks,
 means for suspending said slider above said medium so that the length of said slit is oriented along the cross-track direction and said slit is located a distance above said medium substantially less than the wavelength of said light beam, whereby a small region of one said storage track is selected for storing or reading by illuminating said region with the portion of said focused light beam incident on said medium through said slit, and
 fine tracking means for directing said beam through said slit and for selecting one said storage track for reading by moving said beam along said slit in the cross-track direction.

* * * * *

UNITED STATES PATENT AND TRADEMARK OFFICE
CERTIFICATE OF CORRECTION

PATENT NO.   : 5,161,134

DATED        : November 3, 1992

INVENTOR(S)  : Lee

It is certified that error appears in the above-identified patent and that said Letters Patent is hereby corrected as shown below:

On the Title Page, Item [56],
Under References Cited: "4,525,828 3/1986 Higashiyama et al." should be --4,525,828 6/1985 Higashiyama et al.--.

Under Foreign Patent Documents: "89-904573/13 3/1989 Fed. Rep. of Germany" should be --89-094573/13 3/1989 Fed. Rep. of Germany--.

Column 1, line 49, "!4" should be --14--.

Column 2, line 35, "beaming" should be --bearing--.

Column 3, line 39, "!4" should be --14--.

Signed and Sealed this

Tenth Day of May, 1994

BRUCE LEHMAN

Attest:

Attesting Officer

Commissioner of Patents and Trademarks